(12) United States Patent
Yu et al.

(10) Patent No.: US 9,868,234 B2
(45) Date of Patent: Jan. 16, 2018

(54) METHOD FOR MANUFACTURING CARBON FIBER COMPONENT AND CARBON FIBER COMPONENT MANUFACTURED BY USING THIS METHOD

(71) Applicant: HUAWEI DEVICE (DONGGUAN) CO., LTD., Dongguan (CN)

(72) Inventors: Jiao Yu, Shanghai (CN); Dahai Dong, Shanghai (CN); Chengwen Hu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 615 days.

(21) Appl. No.: 14/288,538

(22) Filed: May 28, 2014

(65) Prior Publication Data

US 2014/0272292 A1 Sep. 18, 2014

Related U.S. Application Data

(63) Continuation of application No. PCT/CN2012/087674, filed on Dec. 27, 2012.

(30) Foreign Application Priority Data

May 4, 2012 (CN) .......................... 2012 1 0137198

(51) Int. Cl.
*B29C 45/00* (2006.01)
*B29C 45/14* (2006.01)
*B29L 31/34* (2006.01)

(52) U.S. Cl.
CPC .... *B29C 45/0001* (2013.01); *B29C 45/14631* (2013.01); *B29C 45/0005* (2013.01);
(Continued)

(58) Field of Classification Search
CPC B29C 2045/14098; B29C 2045/14713; B29C 2045/0058; B29C 45/0005; B29C 45/14631

See application file for complete search history.

(56) References Cited

U.S. PATENT DOCUMENTS 6,624,383 B1 * 9/2003 Lichtenstein ......... B29C 70/545
219/121.67
2003/0175488 A1 9/2003 Asthana et al.
(Continued)

FOREIGN PATENT DOCUMENTS

CN 1746001 A 3/2006
CN 101181822 A 5/2008
(Continued)

OTHER PUBLICATIONS

Partial English Translation and Abstract of European Patent Application No. EP1649999, Part 1, Aug. 31, 2015, 19 pages.
(Continued)

*Primary Examiner* — Jill L Heitbrink
(74) *Attorney, Agent, or Firm* — Conley Rose, P.C.

(57) ABSTRACT

A method for manufacturing a carbon fiber component includes: placing a film with a texture on a first side surface into a mold, where a second side surface of the film abuts against an inner wall of the mold; injecting melted carbon fiber composite plastic into the first side surface through an injection port of the mold to obtain a component in a first shape; and obtaining a component in a second shape from the component in the first shape by using a material removal technique. Compared with the prior art, with the manufacturing method provided in the present invention, on the basis of ensuring a use strength requirement of a component, processing efficiency may be effectively increased. On this basis, the present invention further provides a carbon fiber
(Continued)

component manufactured by using this manufacturing method.

12 Claims, 3 Drawing Sheets

(52) U.S. Cl.
CPC .. *B29C 45/0055* (2013.01); *B29C 2045/0058* (2013.01); *B29L 2031/3481* (2013.01); *Y10T 428/24355* (2015.01)

(56) References Cited

U.S. PATENT DOCUMENTS

| | | | |
|---|---|---|---|
| 2005/0139811 A1* | 6/2005 | Aisenbrey | B29C 45/0013 252/512 |
| 2008/0185755 A1 | 8/2008 | Deaville et al. | |
| 2008/0314511 A1* | 12/2008 | Muko | B29C 45/14827 156/240 |
| 2009/0047854 A1 | 2/2009 | Bleeker et al. | |
| 2009/0084278 A1* | 4/2009 | Masi | G03F 7/0017 101/32 |
| 2011/0027541 A1 | 2/2011 | Chang et al. | |
| 2011/0097540 A1* | 4/2011 | Lin | B29C 37/0032 428/138 |
| 2011/0279002 A1 | 11/2011 | Han et al. | |
| 2012/0001364 A1* | 1/2012 | Shin | B29C 45/14827 264/275 |
| 2012/0207982 A1* | 8/2012 | Aso | B29C 45/0005 428/164 |

FOREIGN PATENT DOCUMENTS

| | | | |
|---|---|---|---|
| CN | 101422945 | A | 5/2009 |
| CN | 101574842 | A | 11/2009 |
| CN | 101636255 | A | 1/2010 |
| CN | 101722620 | A | 6/2010 |
| CN | 102672880 | A | 9/2012 |
| EP | 0719625 | A2 | 7/1996 |
| EP | 1219401 | A2 | 7/2002 |
| EP | 1649999 | A2 | 4/2006 |
| JP | 2007118457 | A | 5/2007 |
| JP | 2009298144 | A | 12/2009 |
| JP | 2011016901 | A | 1/2011 |
| JP | 2011166124 | A | 8/2011 |
| WO | 2006091532 | A1 | 8/2006 |
| WO | 2011/045895 | * | 4/2011 |

OTHER PUBLICATIONS

Partial English Translation and Abstract of European Patent Application No. EP1649999, Part 2, Sep. 3, 2015, 3 pages.
Partial English Translation and Abstract of Japanese Patent Application No. JP2007118457, Part 1, Aug. 31, 2015, 7 pages.
Partial English Translation and Abstract of Japanese Patent Application No. JP2007118457, Part 2, Aug. 31, 2015, 3 pages.
Foreign Communication From a Counterpart Application, European Application No. 12875928.9, Extended European Search Report dated Aug. 26, 2015, 13 pages.
Partial English Translation and Abstract of Chinese Patent Application No. CN101722620A, Jun. 12, 2014, 13 pages.
Partial English Translation and Abstract of Chinese Patent Application No. CN1746001A, Aug. 4, 2014, 2 pages.
Partial English Translation and Abstract of Chinese Patent Application No. CN101636255A, Aug. 4, 2014, 2 pages.
Partial English Translation and Abstract of Japanese Patent Application No. JP2009-298144, Part 1, Aug. 29, 2014, 67 pages.
Partial English Translation and Abstract of Japanese Patent Application No. JP2009-298144, Part 2, Jun. 16, 2014, 9 pages.
Foreign Communication From a Counterpart Application, PCT Application No. PCT/CN2012/087674, English Translation of International Search Report dated Apr. 18, 2013, 3 pages.
Foreign Communication From a Counterpart Application, PCT Application No. PCT/CN2012/087674, Written Opinion dated Mar. 26, 2013, 6 pages.
Foreign Communication From a Counterpart Application, Chinese Application No. 201210137198.9, Chinese Office Action dated Nov. 1, 2013, 7 pages.
Partial English Translation and Abstract of Japanese Patent Application No. JP2011016901A, Mar. 11, 2015, 52 pages.
Partial English Translation and Abstract of Japanese Patent Application No. JP2011166124A, Mar. 11, 2015, 39 pages.
Foreign Communication From a Counterpart Application, Chinese Application No. 2014-542706, Chinese Office Action dated Feb. 24, 2015, 3 pages.
Foreign Communication From a Counterpart Application, Chinese Application No. 2014-542706, English Translation of Chinese Office Action dated Feb. 24, 2015, 2 pages.

* cited by examiner

METHOD FOR MANUFACTURING CARBON FIBER COMPONENT AND CARBON FIBER COMPONENT MANUFACTURED BY USING THIS METHOD

CROSS-REFERENCE TO RELATED APPLICATIONS

This application is a continuation of International Application No. PCT/CN2012/087674, filed on Dec. 27, 2012, which claims priority to Chinese Patent Application No. 201210137198.9, filed on May 4, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a carbon fiber component technique technology, and in particular, to a method for manufacturing a carbon fiber component and a carbon fiber component manufactured by using this method.

BACKGROUND

With development of science and technology and increase of application requirements, a variety of electronic products have emerged, which gradually show a development trend towards lightness and thinness. Meanwhile, on a precondition that an integrated product has the same performance, a product with a favorable appearance effect directly affects a user's choice.

For example, a mobile phone nowadays tends to be light, thin, and have a large screen. It is well known that strength of a housing of a mobile phone is definitely reduced after design with a large screen, lightness, and thinness is adopted. Therefore, a material with higher specific strength is usually selected in an existing design to manufacture a housing of a mobile phone. A carbon fiber composite material is a new material that excels in mechanical properties. Compared with a steel material, its specific gravity is less than ¼ of that of the steel material, but its tensile strength is 7-9 times of that of the steel material. At present, as a carbon fiber composite material is widely applied in various technical fields, it is also frequently applied to a housing of a mobile phone or other bearing components. In particular, a special weaving texture on a surface of a carbon fiber sheet can bring rich appearance and visual effects.

In the prior art, multiple layers of carbon fiber sheets are thermoformed after being attached and stacked by using a thermosetting adhesive, and are processed and manufactured into a coordination structure such as a card fastener by using a computer numerical control (CNC) machine in a later stage. However, this technique is limited by its own characteristics and has the following insurmountable defects: (a) compression molding of multiple layers of carbon fiber sheets takes a relatively long time (thermoforming+cold forming), and is low productive and high-cost; (b) because multiple layers of carbon fiber sheets are attached by using a thermosetting adhesive, a card fastener structure obtained through processing is relatively crispy and insufficient in strength; (c) during a process of compression molding of a component, a carbon fiber sheet is distorted due to stretch, thereby resulting in uneven carbon fiber texture appearance on a surface of the component and affecting appearance quality.

In view of this, it is urgent to find a new way to optimize design for an existing technique for manufacturing a carbon fiber component, so that requirements such as production capacity and a favorable appearance effect can also be taken into account on the basis of effective improvement in component strength.

SUMMARY

In view of the foregoing defects, a technical problem solved in the present invention is to provide a method for manufacturing a carbon fiber component. On this basis, the present invention further provides a carbon fiber component manufactured by using this manufacturing method.

The present invention provides a method for manufacturing a carbon fiber component, including: placing a film with a texture on a first side surface into a mold, where a second side surface of the film abuts against an inner wall of the mold; injecting melted carbon fiber composite plastic into the first side surface through an injection port of the mold to obtain a component in a first shape; and obtaining a component in a second shape from the component in the first shape by using a material removal technique.

Compared with the prior art, the method for manufacturing a carbon fiber component in the present invention reasonably integrates technique measures such as in-mold decoration, injection molding, and material removal. In this method, a film for in-mode decoration is used as a carrier to form a texture presented in appearance, thereby meeting a user requirement for a favorable appearance effect. In another aspect, compared with a conventional method that adopts a thermosetting adhesive for attaching, stacking, and thermoforming, injection molding greatly increases production efficiency, so that problems about low production capacity and a high cost in the prior art can be effectively solved. Moreover, this method reasonably allocates processing overmeasure based on injection molding and material removal techniques, so that product thickness may be relatively larger in injection molding; avoids a problem about a low accepted product rate of a special component such as a thin wall, imposes a relatively lower requirement on a molding equipment, and may further control a processing cost. Apparently, on the basis of relatively high component strength, a carbon fiber component manufactured by adopting this manufacturing method can meet a requirement on aspects such as production capacity and a favorable appearance effect.

The present invention further provides a carbon fiber component manufactured by using the foregoing manufacturing method.

The method for manufacturing a carbon fiber component provided in the present invention may be applied to a thin-and-light type component that has a bearing strength requirement, especially to a thin-wall type component for different electronic devices.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

In FIG. 2, the components are labeled as follows: a film 1, a first side surface 11, a second side surface 12, a mold 2, and an injection port 3.

DETAILED DESCRIPTION

The core of the present invention is to provide a method for manufacturing a carbon fiber component, and on the basis of satisfying relatively high production capacity, enable a carbon fiber component manufactured by using this manufacturing method to meet a requirement for bearing strength and a favorable appearance effect. The following describes an implementation manner of the embodiment of the present invention with reference to the accompany drawings in the specification.

Without loss of generality, this implementation manner is described in detail by using a mobile phone as a subject. It should be understood that specific description of a method for manufacturing a carbon fiber component based on this mobile phone is also applicable to other electronic devices, for example, a notebook computer, a PAD tablet, or the like.

A housing, a display embedded onto the housing (or with both display and input functions), and keys of this mobile phone constitute a complete mobile phone enclosure, and electronic elements are disposed inside the mobile phone enclosure, such as an antenna, a power supply and power control module, a wireless communications processor, a radio frequency circuit, a subscriber identity module (SIM) card (detachable or undetachable) of a mobile phone company, an alterable and programmable memory for storing information such as several phone numbers, a language processing module, an interface for writing a phone number, and the like. In addition to the housing, all other functional elements may apply the prior art and are not further described herein.

Figure 1:
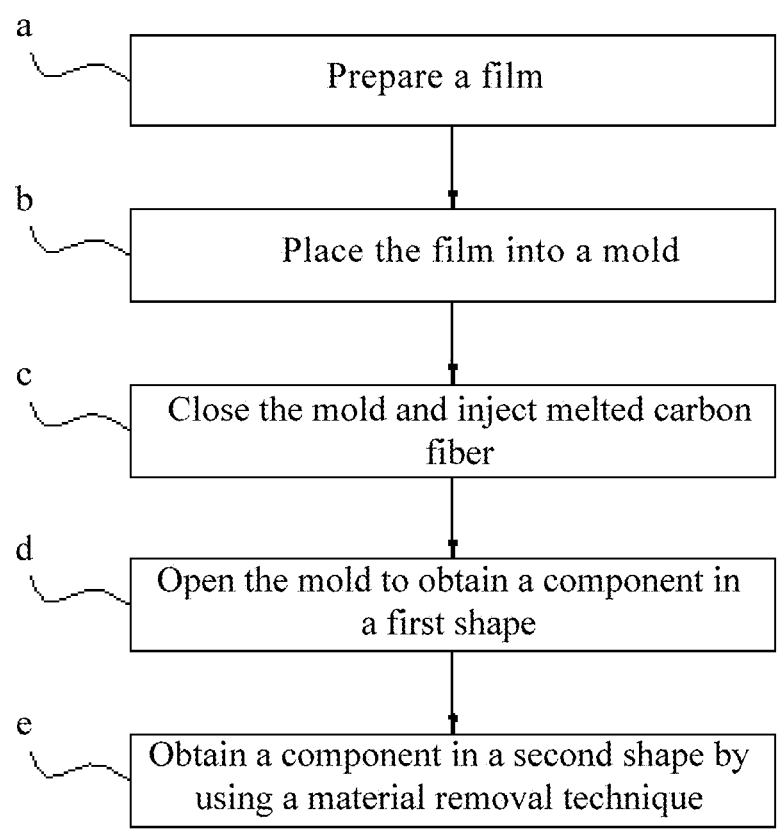
FIG. 1 is a flowchart block diagram of a method for manufacturing a carbon fiber component according to a first embodiment.

Referring to FIG. 1, FIG. 1 is a flowchart block diagram of a method for manufacturing a carbon fiber component according to a first embodiment.

Figure 2:
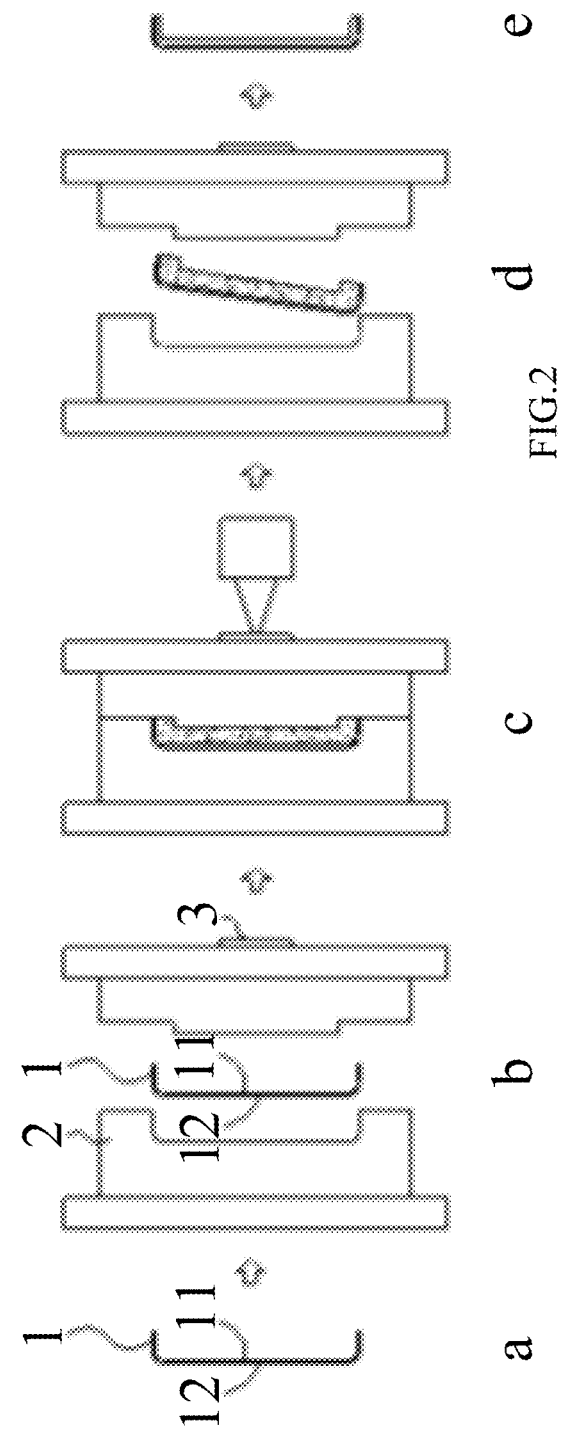
FIG. 2 is a simplified diagram of each operation of the method for manufacturing a carbon fiber component according to the first embodiment.

A housing of a mobile phone in this implementation manner is manufactured by using this manufacturing method. For ease of understanding, referring to FIG. 2, FIG. 2 is a simplified diagram of each operation of the method for manufacturing a carbon fiber component in this implementation manner.

This method is executed according to the following steps:

a. Prepare a film 1 in a predetermined shape, where a first side surface 11 of the film 1 has a texture.

This texture may be formed by adopting an ink coating manner. An embossing technique is preferably adopted to obtain a decorative texture. It should be understood that, preparing a film in a predetermined shape is an optional/preferred step for the method for manufacturing a carbon fiber component in this application.

b. Place the film 1 obtained in step a into a mold 2, where a second side surface 12 of the film 1 abuts against an inner wall of the mold 2. After injection molding is completed, the second side surface 12 is formed on an external surface of the housing of the mobile phone.

c. Close the mold to perform injection of melted carbon fiber composite plastic. Preferably, an injection port 3 is provided on a same side with the first side surface 11 of the film 1 to inject the melted carbon fiber composite plastic into the first side surface, so as to form a housing substrate with the carbon fiber composite plastic as a main body.

d. Open the mold to obtain a housing in a first shape.

e. Obtain a housing (e.g., a component) in a second shape from the housing in the first shape by using a material removal technique, where the second shape is the same as the predetermined shape of the housing. The predetermined shape involved in this specification is a product design shape. It should be understood that the material removal technique involved in this step includes processing of wall thickness of an enclosure, and also includes processing of an entity function structure such as a card fastener and specific function structures such as a hole and a slot (not shown in the figure).

This method adopts an in-mold labeling (IML) technology, where the film 1 is used as a carrier for presenting a decorative texture, so as to obtain an expected tactile sensation according to a requirement for an indication function or an appearance effect, and have favorable appearance experience; and moreover, because a texture is attached onto an inner side surface of the film 1, phenomena such as a color change and color fade do not occur, and a decorative effect is consistent. Meanwhile, a housing laminate adopts carbon fiber composite plastic for injection molding, which greatly increases production efficiency and has relatively high strength compared with the prior art. In addition, during a specific execution process, a person skilled in the art may reasonably determine, based on injection molding and material removal techniques, processing over measure, which can significantly reduce a technique cost of an injection molding operation.

A material of the film 1 used in this method may be selected according to an actual situation, for example, adopting polyethylene terephthalate (PET) plastic or polycarbonate (PC) plastic. The texture on the first side surface 11 of the film 1 may be a carbon fiber sheet texture, where its organic plane sorting may be exactly the same as that of an actual carbon fiber texture. Further, a three-dimension pattern may also be formed by means of embossing. In other words, an internally dented depth of a corresponding pattern is also the same as that of an actual carbon fiber texture, thereby further increasing the richness of products and providing users with plumper visual experience and a more lifelike material tactile sensation.

In addition, three-dimension pattern design may also allow melted carbon fiber composite plastic to enter an internally dented pattern with a capillary action, which increases a specific surface area between the film 1 and the melted carbon fiber composite plastic, thereby increasing a connection stability degree between the two after solidification molding, and effectively preventing the film 1 from cracking.

It can be understood that the internally dented depth of this three-dimension pattern may also be formed by using a material removal technique.

A thickness of a carbon fiber sheet of the film 1 that serves as a base material is relatively thin. Forming the carbon fiber sheet texture by using a material removal technique inevitably requires a technical measure with a relatively high technique cost. Therefore, forming a three-dimension carbon fiber texture on the first side surface 11 of the film 1 by using an embossing technique is an optimal solution.

In the foregoing solution, the texture on the first side surface 11 of the film 1 is a carbon fiber sheet texture. Apparently, a texture of another artistic pattern may also be designed to obtain a more personalized artistic effect. With social progress and rapid development of science, technology and economy, a consumer's pursuit of a personalized taste increases continuously. Therefore, texture design of a housing of a mobile phone is also continuously innovated, for example, a more digitized three-dimension pattern, or a simulation of a trace left during machining, or a simulation closer to the nature for a tactile sensation like direct contact with a tree, a piece of fur, or a metal to increase a sense of reality of a product.

Color design also plays an important role in texture design. To meet requirements of different groups of people, exactly the same patterns may also have multiple color schemes. For example, a most commonly used color scheme for a carbon fiber texture is black or white. This solution may also adopt a more colorful color scheme, for example, agate pink, coral blue, wine red, sunlight orange, brown, metal gray, and the like. These color schemes may be all implemented by means of printing on the film 1, so that housings of mobile phones have multiple splendid colors.

For a thin-shell type carbon fiber component such as the housing of the mobile phone in this implementation manner, in an actual execution process of this method, difficulty and a processing cost of an injection molding technique should be considered. It is determined through a production test that, for a housing product designed with a 0.3 millimeter (mm)-0.6 mm thick carbon fiber composite plastic layer, or for a finished product designed with a 0.3 mm-0.6 mm thick carbon fiber composite plastic layer of the component in the second shape, a thickness of a carbon fiber composite plastic layer of the component in the first shape in the foregoing operation is 1.0 mm-2.0 mm. In one aspect, size configuration in this operation can effectively adapt to fluidity of carbon fiber composite plastic, and on the basis of ensuring injection molding yield of semi-finished products, can lower a requirement for selecting a molding device in this operation; and in another aspect, a complex product structure may be implemented and processing overmeasure and a processing cost of a material removal technique may be controlled to the most extent.

In addition, the material removal technique preferably adopts a CNC machine to remove a corresponding material. The CNC machine has the following characteristics: high processing precision, providing stable processing quality; linkage of multiple coordinates may be performed, a part in a complex shape can be processed; high productivity, which is usually 3-5 times of a common machine; a high automation degree, which may relieve labor intensity of an operator; and batch production, for easy control of product quality. Therefore, the CNC machine may be adopted to further increase production capacity and control product precision.

To prevent the melted carbon fiber composite plastic from affecting attachment stability of the foregoing texture during a flowing process, parameters may be further optimized reasonably in view of its specific injection molding technique. Preferably, injection molding pressure for the melted carbon fiber composite plastic is not greater than 100 megaPascals (MPa), and an injection speed is not greater than 60 millimeters per second (mm/s). It is determined through a production test that, for a housing product designed with a 0.3 mm-0.6 mm thick carbon fiber composite plastic layer, an optimal effect with production capacity and yield taken into account can be achieved when the injection molding pressure is 70 MPa and the injection speed is 30 mm/s.

Figure 3:
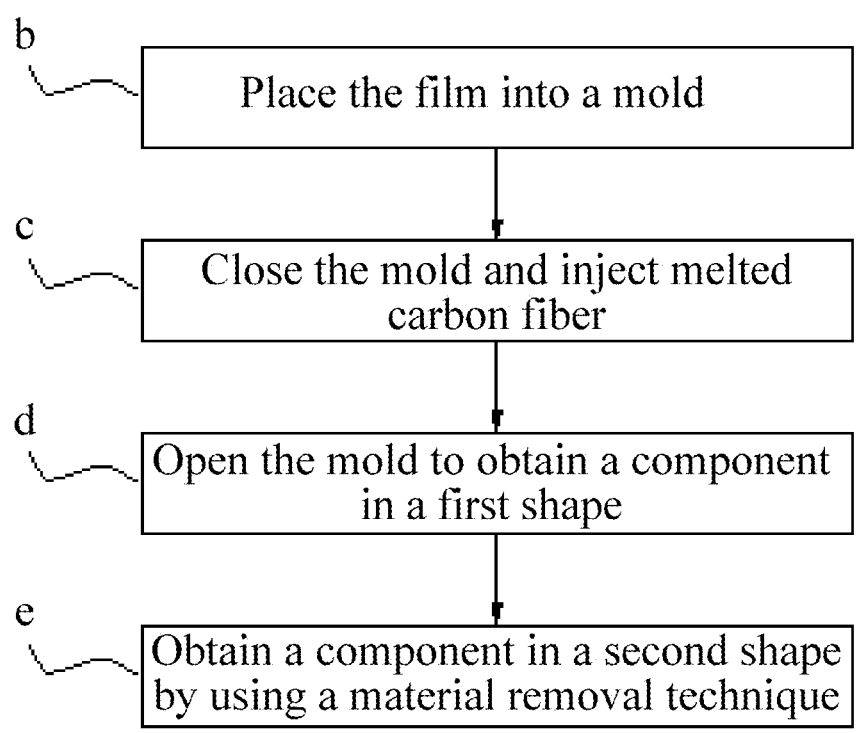
FIG. 3 is a flowchart block diagram of a method for manufacturing a carbon fiber component according to a second embodiment.

In the foregoing method for manufacturing a carbon fiber component according to the first embodiment, step a is a preferred step in the method for manufacturing an optional carbon fiber component. Based on this, this specification further provides another embodiment related to the method for manufacturing a carbon fiber component. For details, referring to FIG. 3, FIG. 3 is a flowchart block diagram of a method for manufacturing a carbon fiber component according to a second embodiment.

This method is executed according to the following steps:

b. Place a film 1 in a predetermined shape into a mold 2, where a first side surface 11 of the film 1 has a texture and a second side surface 12 of the film 1 abuts against an inner wall of the mold 2. After injection molding is completed, the second side surface 12 is formed on an external surface of the housing of the mobile phone.

c. Close the mold to perform injection of melted carbon fiber composite plastic, so as to form a housing substrate with the carbon fiber composite plastic as a main body.

d. Open the mold to obtain a housing (e.g., a component) in a first shape.

e. Obtain a housing in a second shape from the housing in the first shape by using a material removal technique, where the second shape is the same as the predetermined shape of the housing.

It should be understood that, a design idea related to a method for manufacturing a carbon fiber mobile phone housing in the present invention may also be applied to a housing or another bearing component of an electronic device such as a PAD computer or a notebook computer.

The foregoing descriptions are merely exemplary embodiments of the present invention. It should be noted that a person of ordinary skill in the art may also make several improvements and modifications without departing from the principle of the present invention, and such improvements and modifications shall also fall within the protection scope of the present invention.

What is claimed is:

1. A method for manufacturing a carbon fiber component, comprising:
    placing a film with a texture on a first side surface into a mold, wherein a second side surface of the film abuts against an inner wall of the mold;
    injecting melted carbon fiber composite plastic into the first side surface through an injection port of the mold to obtain a component in a first shape; and
    obtaining a component in a second shape from the component in the first shape using a material removal technique,
    wherein a carbon fiber composite plastic layer in the component in the first shape is 1.0 millimeters (mm)-2.0 mm thick,
    wherein a carbon fiber composite plastic layer in the component in the second shape is 0.3 mm-0.6 mm thick,
    wherein the material removal technique adopts a computer numerical control (CNC) machine to remove a corresponding material, and
    wherein the texture is a carbon fiber texture formed by adopting an embossing technique.

2. The method for manufacturing the carbon fiber component according to claim 1, wherein the carbon fiber component comprises a housing of a mobile phone or a housing of a tablet.

3. The method for manufacturing the carbon fiber component according to claim 1, wherein the carbon fiber component comprises a thin-wall type component.

4. The method for manufacturing the carbon fiber component according to claim 1, wherein injection molding pressure of the melted carbon fiber composite plastic is not greater than 100 megaPascals (MPa), and wherein an injection speed is not greater than 60 millimeters per second (minis).

5. The method for manufacturing the carbon fiber component according to claim 1, wherein the film comprises a polyethylene terephthalate (PET) plastic.

6. The method for manufacturing the carbon fiber component according to claim 1, wherein the film comprises a polycarbonate (PC) plastic.

7. The method for manufacturing the carbon fiber component according to claim 1, wherein the film is a plastic film that is embossed with a three-dimensional pattern.

8. The method for manufacturing the carbon fiber component according to claim 1, wherein the texture of the film is made from an ink coating.

9. The method for manufacturing the carbon fiber component according to claim 1, wherein the material removal technique forms a card fastener in the carbon fiber component.

10. The method for manufacturing the carbon fiber component according to claim 1, wherein the material removal technique forms a hole or a slot in the carbon fiber component.

11. The method for manufacturing the carbon fiber component according to claim 1, wherein a color of the carbon fiber component is selected from one of a plurality of different colors.

12. The method for manufacturing the carbon fiber component according to claim 1, wherein injection molding pressure of the melted carbon fiber composite plastic is about 70 megaPascals (MPa), and wherein an injection speed is about 30 millimeters per second (mm/s).

* * * * *

UNITED STATES PATENT AND TRADEMARK OFFICE
CERTIFICATE OF CORRECTION

PATENT NO. : 9,868,234 B2
APPLICATION NO. : 14/288538
DATED : January 16, 2018
INVENTOR(S) : Jiao Yu, Dahai Dong and Chengwen Hu It is certified that error appears in the above-identified patent and that said Letters Patent is hereby corrected as shown below:

Column 7; Line 13, Claim 4 should read:
(mm/s).

Signed and Sealed this
Twentieth Day of March, 2018

Andrei Iancu
*Director of the United States Patent and Trademark Office*